Sept. 7, 1937.  H. C. CAIN  2,092,440
MILKING SYSTEM
Filed Jan. 23, 1936  4 Sheets—Sheet 1
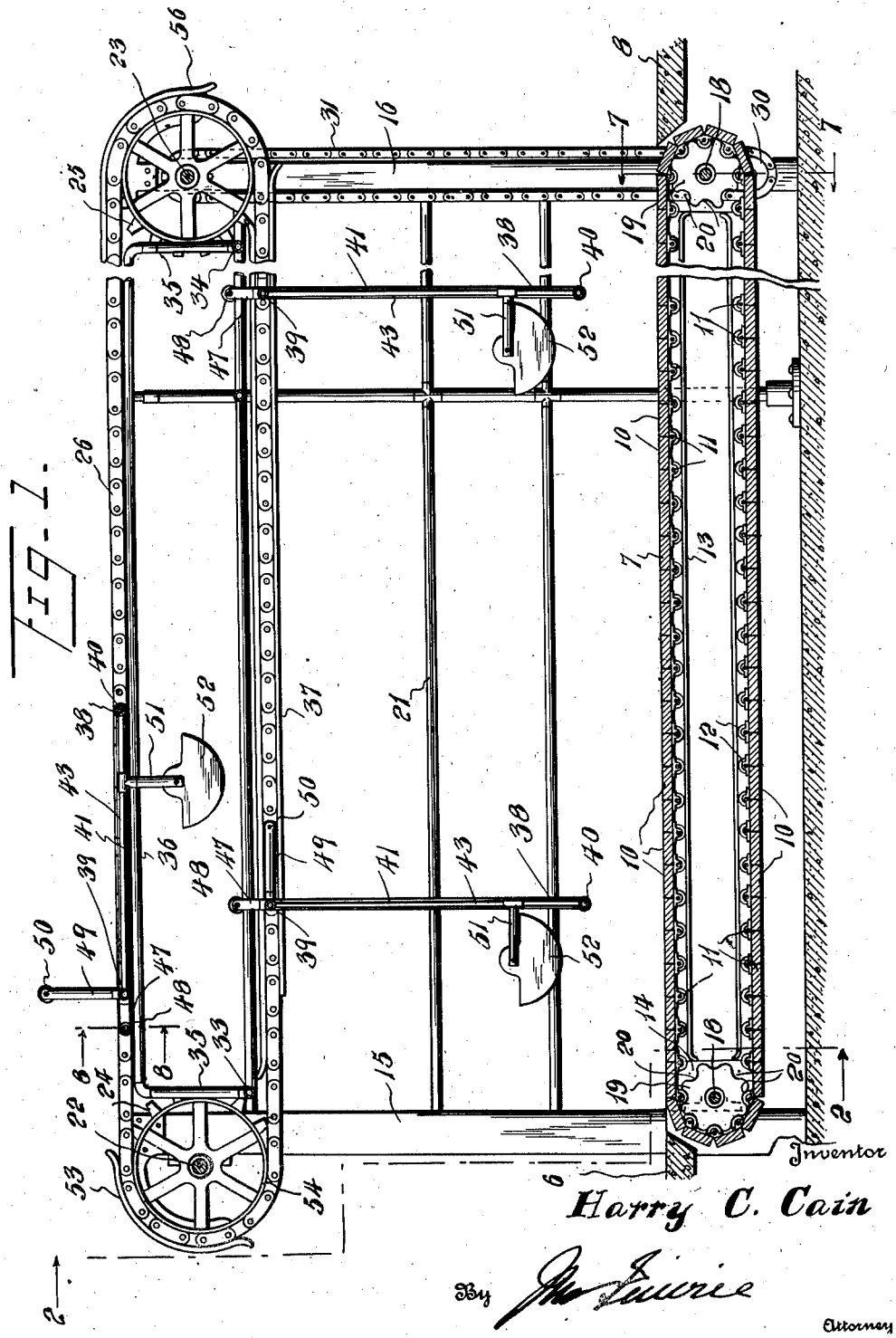
Inventor
Harry C. Cain
By 
Attorney Sept. 7, 1937. H. C. CAIN 2,092,440
MILKING SYSTEM
Filed Jan. 23, 1936 4 Sheets-Sheet 2
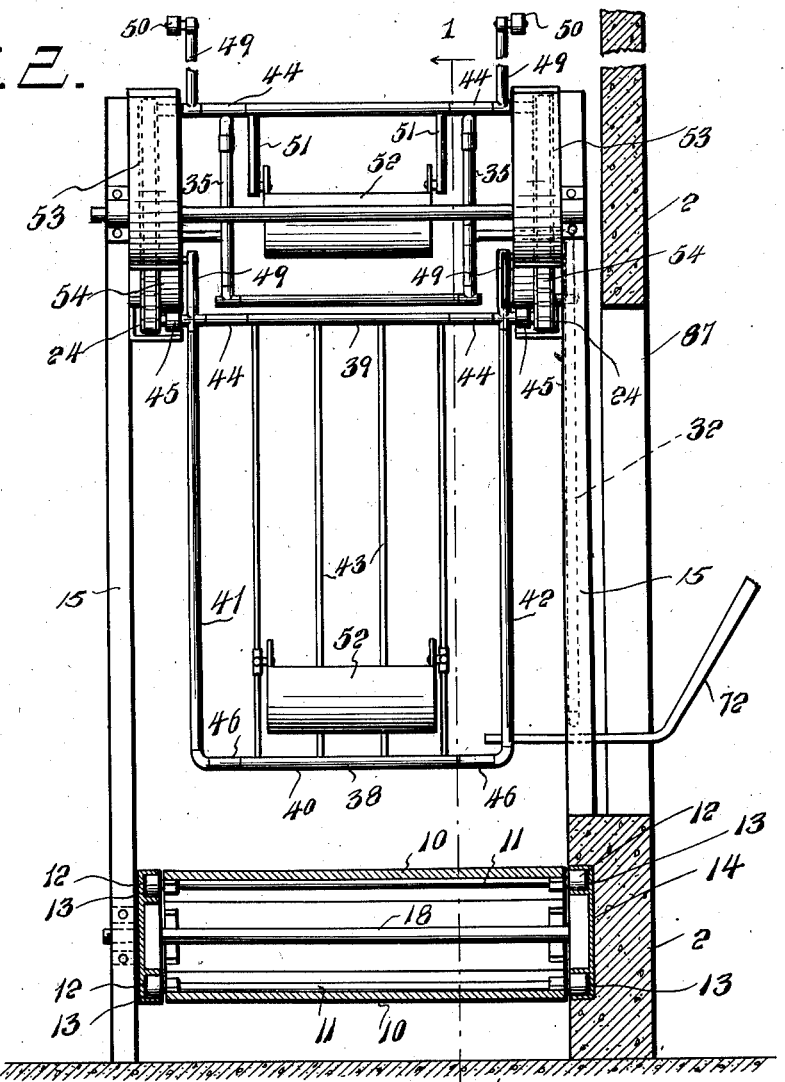
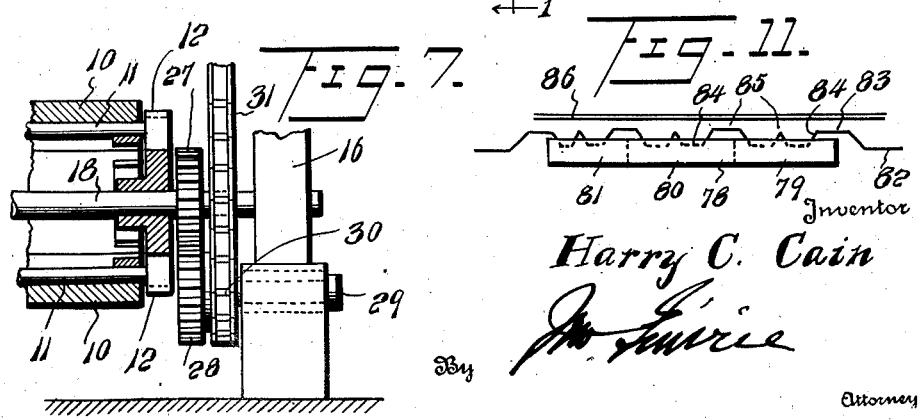
Inventor
Harry C. Cain
By
Attorney Sept. 7, 1937. H. C. CAIN 2,092,440
MILKING SYSTEM
Filed Jan. 23, 1936 4 Sheets-Sheet 3

Inventor
Harry C. Cain
By
Attorney

Sept. 7, 1937.  H. C. CAIN  2,092,440
MILKING SYSTEM
Filed Jan. 23, 1936  4 Sheets-Sheet 4
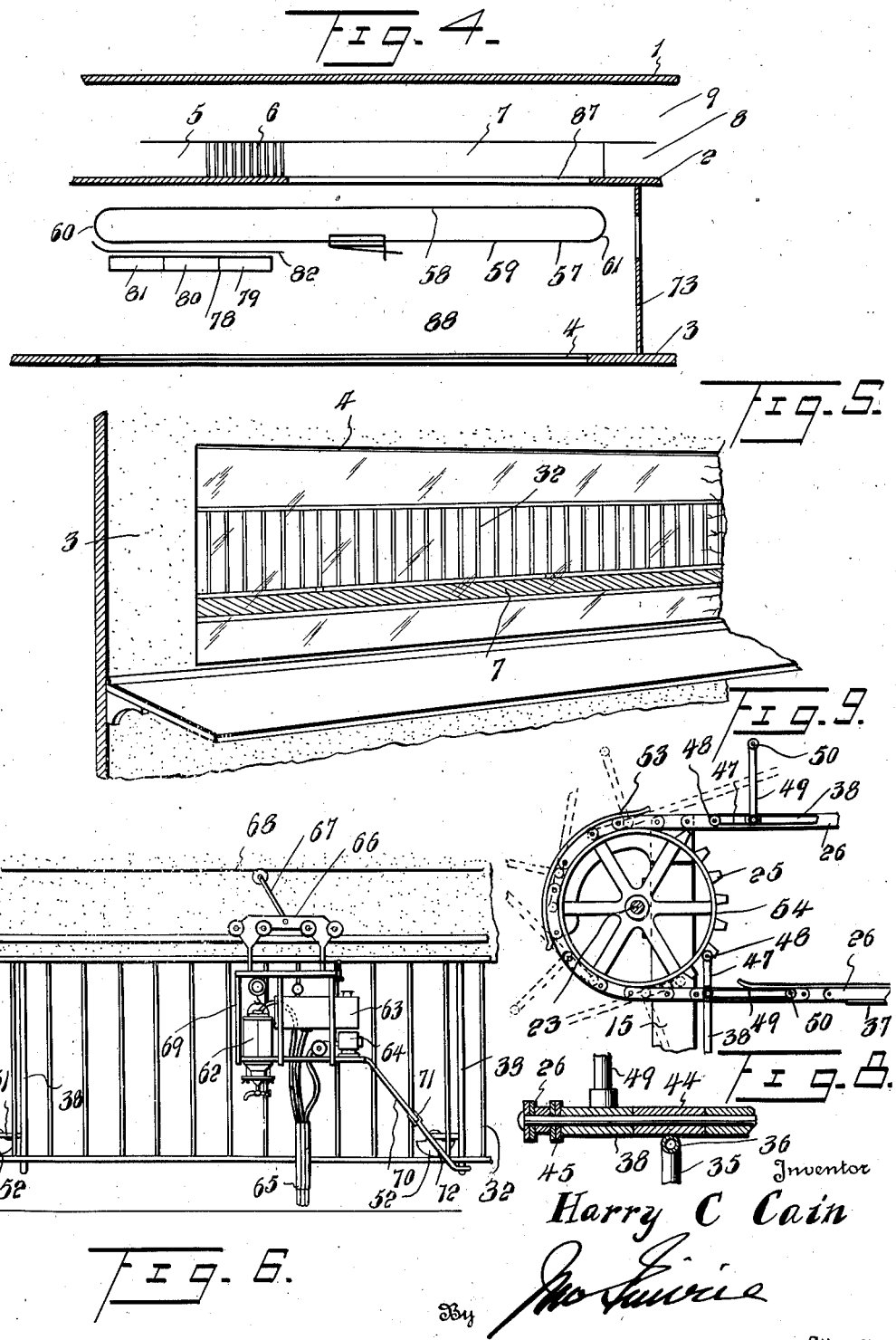

Patented Sept. 7, 1937

2,092,440

UNITED STATES PATENT OFFICE 2,092,440

MILKING SYSTEM

Harry C. Cain, Oklahoma City, Okla.

Application January 23, 1936, Serial No. 60,516

14 Claims. (Cl. 31—58)

This invention is directed to a system for milking cows wherein the animals are moved in independent stalls throughout a definite distance and automatically milked during such travel.

For the purpose of an educational knowledge on the part of the general public as to the completely sanitary, wholesome and cleanly method of milking cows, there has recently been developed what is generally known as milking parlors wherein the general public may view the complete milking operation either as a direct educational exhibition or as an adjunct to a restaurant, dairy or other like business. The present invention is designed with a view to providing such an exhibition and, therefore, necessarily involves progressive milking of a series of cows in succession passing before the eyes of the observer.

It has been heretofore proposed, for such exhibition purposes, to provide a series of stalls radially disposed on a rotating platform, with the cows admitted at one end of the stall, subjected to an automatic milking operation while in the stall, and moving from the stall at the opposite end. This necessarily requires the movement of the cows in a circular path before the eye of the observer, tending to confusion, and obstructing at all times a clear vision of the milking operation.

The primary object of the present invention is to cause the cows to enter a series of successively and automatically formed stalls, with the cow when in the stall supported on a slowly moving platform traveling across the vision of the observer and during which travel the automatic milking operation is carried out. Thus, the cows move in an endless line during the exhibition, each cow and the milking operation thereof being carried out free of any obstruction to the eye of the observer, so that if desired the milking operation of a particular cow may be under the eye of the observer to the exclusion of the other cows throughout the full range of vision. Thus, in the fullest sense of the word, the observation of the operation is complete and uninterrupted with respect to each cow as well as to the series of cows.

A further object of the invention is the provision of a traveling platform above which is arranged a fixed skeleton frame through which the animals are clearly visible. Above the platform and automatically controlled are a series of gates which are successively delivered to the space above the platform and on the side of the frame away from the eye of the observer in a manner to provide spaced, relatively rigid division gates defining a series of stalls in each of which an animal is accommodated. An automatic milking apparatus is mounted for movement above and commensurate with the movement of the platform, which milking apparatus is properly connected as the animal enters its stall and operated for the milking operation during the relatively slow movement of the animal incident to the movement of the platform before the eye of the observer.

The invention is illustrated in the accompanying drawings, in which:

Figure 1 is a vertical sectional view, partly in elevation, illustrating the details of the invention, the line of section being indicated on the line 1—1 of Figure 2.

Figure 2 is a sectional view on the line 2—2 of Figure 1.

Figure 4 is a plan view diagrammatically illustrating the disposition of the washing runway for the animals and the moving platform.

Figure 5 is a broken perspective illustrating the relation of the parts when the system is designed as a milking parlor.

Figure 6 is a broken front elevation showing the mounting and relation of the milking apparatus.

Figure 7 is a sectional view on the line 7—7 of Figure 1.

Figure 8 is a sectional view on the line 8—8 of Figure 1.

Figure 9 is a broken view in elevation showing the cam for positioning the stall-defining gates.

Figure 11 is a side elevation of the washing compartment, showing in diagrammatic outline the track for controlling the introduction and removal of the parts of the milking apparatus being washed.

Figure 3:
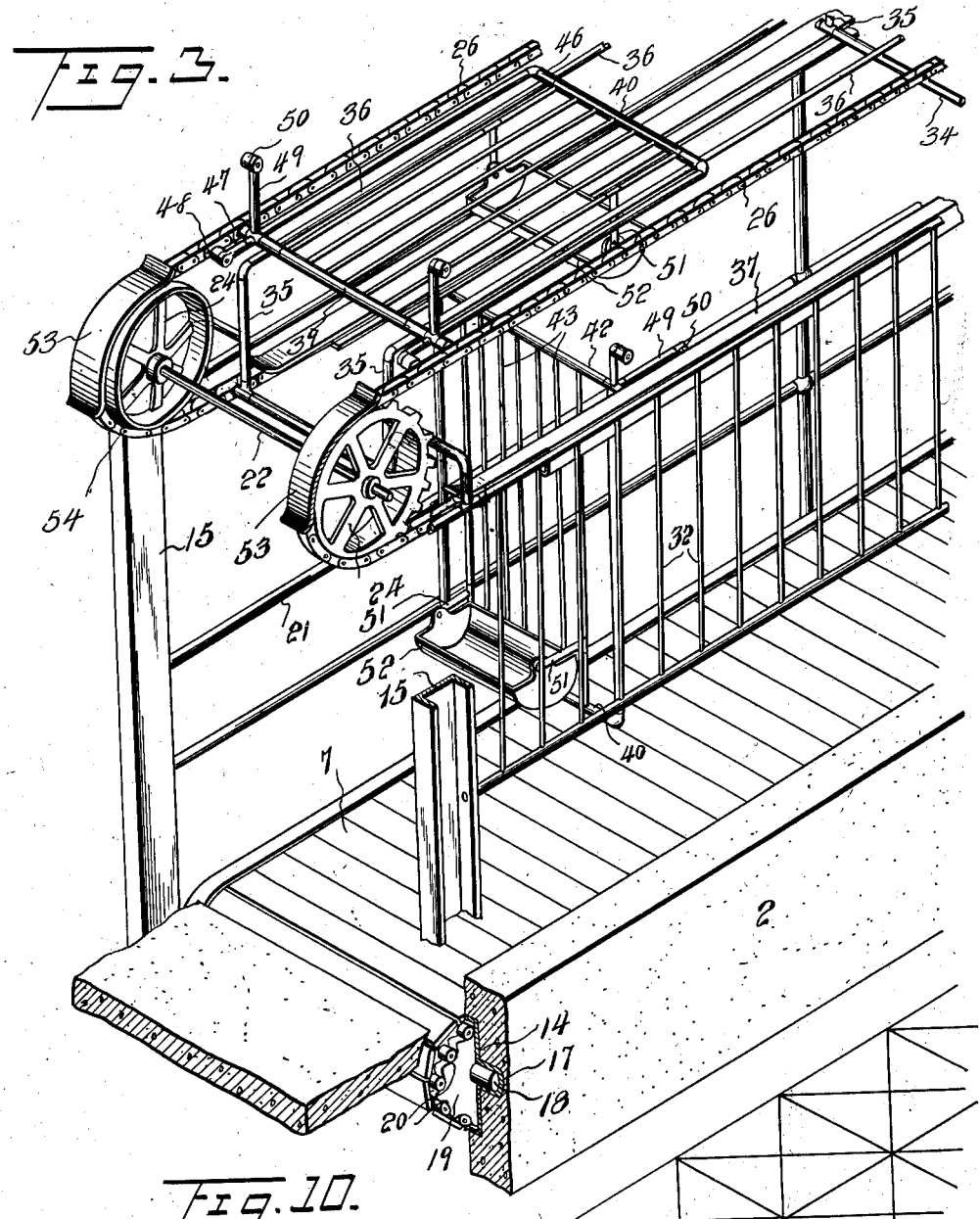
Figure 3 is a broken perspective view illustrating sufficient of the detail to show the automatic operation of the division gates in forming the stalls and the relation of such to the skeleton frame and to the moving platform.

The improved milking system or apparatus is arranged in an appropriate building which, for the purpose of the present invention, may be said to include a rear wall 1, a spaced parallel wall 2, and a further forward wall 3, with the latter formed with an opening 4 through which the carrying out of the system may be seen where the system is arranged for exhibition purposes.

That space included between the walls 1 and 2 is designed to receive a runway 5 along which the cows pass in successive order, with such runway, including a grating 6 on which the cows are thoroughly washed as an incident prior to their milking. In line with the grating is a movable platform 7 which will be more particularly described hereinafter and on which the cows are moved in stall-like formation during the milking operation.

At the exit end of the platform, the runway is continued, as at 8, along which the cows, after being milked, pass to the barns or other place. The space 9 between the parts just described and the wall 1 is preferably formed as a depressed area, that is below the level of the runway, which may have convenient sewer outlet or other connection and in which the attendants may be positioned to clean away the refuse collected during the washing of the cows delivered through the grating 6.

The movable platform 7 is of endless form with its upper or operative plane on a level with the grating 6 and the discharge.runway section 8. The platform is made up of hingedly connected slat-like elements 10 supported at their junctures on transverse rods 11, with such rods provided beyond the ends of the slat-like elements with rollers 12 designed to cooperate with channels 13 in side plates 14.

The side plates 14 are supported at one side in an appropriate recess in the wall 2 and at the opposite side in front and rear channeled uprights 15 and 16 appropriately supported and extending above the platform for the support and mounting of additional devices to be described. Similar front and rear channeled uprights, also indicated at 15 and 16, are supported by the wall 2.

The side plates 14 at the respective ends of the platform are formed with bearing recesses 17 to receive the ends of a shaft 18 on which, in line with the channels 13, are mounted disk-like rollers 19 peripherally formed with recesses 20 in which the rollers 12 are fitted successively to provide a means, to be later referred to, for positively moving the platform and serving to guide the platform at its respective ends during such movement.

The channels 13, or more particularly the lower walls thereof, provide a means for supporting the platform, and particularly the upper flight thereof, throughout the full length of the travel of the platform, and as the rods 11 form a support for the slat-like elements at their junctures transversely of the platform, it is apparent that the platform is supported against possibility of tilting and in a manner to insure its smooth, ready operation and thus guard particularly against any distortion of the platform in the event the cow should step or rest upon the edge of the slat-like element rather than its central portion.

Supported in the front and rear channeled uprights 15 and 16 at the inner side of the platform is a fixed skeleton framework made up of appropriately connected bars 21, these bars rising, of course, above the platform and providing in effect an inner fixed wall of the stall compartments to be later described.

Supported in appropriate bearings in the forward channeled uprights 15 is a shaft 22, a similar shaft 23 being mounted in the rear channeled uprights 16. Carried by the shaft 22 adjacent the respective ends thereof are sprocket wheels 24, similar sprocket wheels 25 being mounted on the rear shaft 23, and sprocket chains 26 cooperate with the longitudinally aligned pairs of sprocket wheels 24 and 25.

The shaft 18 at the rear of the platform 7 is provided with a gear 27 meshing with a gear 28 on a power-driven shaft 29, which latter shaft carries a sprocket wheel 30 connected by a chain 31 to a sprocket wheel on the rear shaft 23 above the platform. Thus, the platform, or more particularly the upper flight thereof, is caused to travel in the same direction as the lower flight of the sprocket chains 26, and furthermore the power for driving the platform is arranged at the rear end thereof in order to compel a pulling action on the operative flight of the platform.

Supported in the channeled uprights 15 and 16 at the forward side edge of the moving platform is a skeleton frame 32 made up of appropriate bars arranged in any order so long as it does not seriously obstruct the vision. This frame forms the forward side wall of the stalls to be later referred to and the important detail of said frame is that it shall be supported at an appreciable distance, approximately 18 inches, above the platform and between the lower edge of the frame and the platform there shall be a clear, uninterrupted space throughout the full length of the platform in order to carry out the milking operation, as will later appear.

The rear skeleton wall 21 and the fixed frame 32 form in effect side walls spaced apart approximating the width of the platform and define, in the absence of the stall-forming gates, an uninterrupted channel of which the moving platform forms the bottom, the fixed frame 21 forms the rear side wall, and the frame 32 forms the forward side wall. This stall-forming channel is freely and readily accessible from the uninterrupted space between the platform and the lower edge of the frame 32.

The animals, after being washed on the runway above the grating 6, pass forward toward and onto the inlet end of the moving platform between the fixed wall 21 and the frame 32. Of course, the washing area, that is the part of the runway in which the grating 6 is arranged, may be provided with gates to admit the cows singly to the washing position and from the washing position to the moving platform. This detail, as well as the means for washing the cows, is unimportant so far as the present invention is concerned, it being understood that the cows are washed singly in succession and after being washed, each cow passes forward onto the moving platform.

In order to provide for effective separation of the cows, while permitting them to pass in comparatively close successive order incident to the travel of the moving platform, it is important that the channel between the fixed frame 21 and the frame 32 be divided into stalls in which the cows may be more or less confined during the milking operation. As the cows move onto the platform in succession at the inlet end of the platform and move off of the platform in succession at the outlet end, it is apparent that the stalls, that is, more particularly the transverse divisions of the channel between the fixed wall 21 and the frame 32, must be automatically provided for at the inlet end of the platform and automatically removed at the exit end of the platform.

To provide for the support and operation of the movable stall-defining gates, front and rear transverse rods 33 and 34 are connected to support uprights 35 connected by guide bars 36. These guide bars 36 are disposed inwardly of the respective chains 26 and substantially on the horizontal plane of such chains. The supports for the bars 33 and 34 are arranged to avoid interference with the moving gates, later referred to.

Supported by the transverse bars 33 and 34 in line with the lower flights of the sprocket chains 26 are channeled bars 37 of U-form in cross section to thus provide substantially in the plane of the lower flights of the sprocket chains 26 a channeled guide member which extends substantially throughout the full length of travel of the stall-defining gates indicated at 38.

The stall-defining gates 38 are of skeleton form including an upper bar 39, a lower bar 40, side bars 41 and 42 and spaced parallel connecting bars 43 joining the upper and lower bars. There is thus defined a rectangular skeleton-form gate which, as shown more particularly in Figure 2 of the drawings, is somewhat less in width than the transverse dimension of the channel formed between the fixed wall 21 and the frame 32.

The upper bar 39 is provided with an internal rod which, within the length of the side bars 41 and 42, supports roller sections 44 and which rod extends beyond the side bars and is terminally connected to opposing links of the chains 26, a roller 45 being mounted on the bar between the side bars 42 of the gate and the connection of the bar with the chain.

The lower bar 40 is also provided with an internal rod on which are mounted roller sections 46 vertically aligned with the roller sections 44. The roller sections 44 and 46 are designed to support the gate in rolling contact with the guide bars 36 to facilitate movement without wear.

The side bars 41 and 42 extend above the upper bar 39 to define trip projections 47 which are terminally provided with laterally offset rollers 48. Rigid with the side bars 41 and 42 and extending at right angles thereto are holding projections 49 terminating in laterally disposed rollers 50.

Near the lower ends, certain of the uprights 43 of the gate are provided with rigid arms 51, preferably adjustable vertically of the uprights, between the free ends of a pair of which arms is swingingly supported a feed trough 52, preferably of arcuate bottom form, as illustrated.

The operation of one stall-defining gate will be described. In inoperative position, that is when moving toward the inlet end of the platform on the plane of the upper flights of the chains 26, the gate as a whole is resting on and moving longitudinally of the guide bars 36 through convenient contact with the roller sections 44 and 46. In this position, the feed trough is depending between the guide bars 36 and the holding section 49 is projecting upwardly at right angles to the gate, which is now in substantially a horizontal position, with the trip projections 47 also projecting horizontally forwardly of the connection between the gate and chains.

Secured to the forward uprights 15, and arranged concentric with the forward sprocket wheels 24, are guide flanges 53, and secured to each of said sprocket wheels on the relatively inner side thereof are additional guide flanges 54 which extend throughout the full periphery of the sprocket wheels and, of course, move with the wheels. As the gate supported on the guide bars 36 reaches the forward sprocket wheels 24, the trip projection 47, or more particularly the roller 48 thereof, rides between the moving flange 54 and the fixed flange 53, the transverse dimension of the flange 53 being such as to avoid interference with the holding projections 49, as clearly indicated in Figure 2 of the drawings.

As the gate proceeds under the moving influence of the chains, the trip projections cause an obvious swinging movement of the gate on its connection with the chains as a center, until the position of the gate is reversed.

When the gate in this movement reaches a point where the weight of the gate would tend to swing it on its pivotal supports, slightly below which point the flange 53 terminates, a too rapid swinging of the gate under such influence is prevented by contact of the rollers 48 bearing against the flange 54, thus causing the gate to gradually and progressively move from the horizontal position on the guides 36 to a vertical position depending from the chains at the lower portion of the forward sprocket wheels. In this position, the gate is vertically disposed below the lowermost flights of the chains 26, and as the gate reaches this position, the rollers 50 on the guide projections 49 ride into the guide channels 37 and thus the gate is held in a vertical position for travel longitudinally of the channel defined between the fixed wall 21 and the frame 32.

At the exit end of the platform, outer spaced guide flanges 56 secured to the rear uprights 16 receive the trip projections and gradually shift the gate into a horizontal position necessary for its forward travel on the upper flights of the chains and on the guide bars 36.

With the gates appropriately spaced throughout the length of the chains, it is apparent that such gates will in succession ride into stall-defining relation and thus, as the movement is continued, provide stalls for the respective animals, with the gates forming the end partitions of a stall, the rigid wall 21 forming one side, and the frame 32 forming the other side.

As the animals proceed over the grating 6 and onto the moving platform 7, they enter the channel or space between the fixed wall 21 and the frame 32 in rear of the gate already positioned, and as the particular animal reaches this position, the next gate moves into position to define a stall in which the animal is confined during the milking operation. Of course, the animals pass in succession onto the platform and arranged in succession in succeeding stalls which are automatically made up or completed in the manner described.

At the exit end of the platform where the stall-defining gates are successively moved upwardly into inoperative position, it is apparent that in the particular instance the gate forming the head partition of the stall of a particular animal is moved out of the way, permitting the animal to pass off the platform onto the exit runway.

Appropriately formed, automatically acting milking devices are designed to be supported beyond the wall 2 relative to the movable platform 7 and to move as a unit with each of the stalls for perfecting the milking of the particular animal in the stall. To provide for the support and travel of the milking devices, a substantially oval trackway 57 is appropriately supported in longitudinal parallelism with and, of course, above the movable platform. This trackway 57 includes the spaced longitudinal sections 58 and 59, a forward end loop 60 and a rear end loop 61. The parallel longitudinal sections 58 and 59 are, of course, designed to support the milking apparatus for travel in opposite directions and are spaced apart a sufficient distance to avoid interference during such travel.

The type of milking apparatus employed is unimportant as any conventional means to this end or any appropriately designed mechanism may be used. As shown more particularly in Figure 6, the mechanism includes a glass milk container 62, a vacuum tank 63, a motor 64 and the necessary tubes including the teat cups 65. The apparatus is hung over a trolley 66 arranged for appropriate travel on the trackway 57 and includes a trolley arm 67 arranged to contact with an overhead conductor 68, whereby current may be led to the motor 64 for the production of the necessary vacuum in the vacuum tank 63, as is conventionally understood.

The milking apparatus is mounted in a frame 69, and depending from this frame is an arm 70. The arm 70 extends downwardly at an angle to the vertical plane of the frame and is made up of two sections swingingly connected at 71, with the lower section 72 of the arm of such length and so formed at its lower end that it may be extended beneath the frame 32 and engaged by the side bar 42 of a gate, as clearly indicated in Figure 2 of the drawings.

When the gates are in position to confine the animal in the stall, the section 72 of the arm is swung down to engage the forward gate of such stall, so that the milking apparatus is drawn forward by that gate on the inner section 58 of the trackway 57, whereby the milking operation, after the connection of the teat cups 65, the tubes of which are also extended below the bottom of the frame 32, can be effectively carried out during the movement of the platform. The section 72 of the arm 70 may be swung out of the path of the gate at the exit end of the platform to discontinue the movement of the particular milking apparatus and permit the gate to move to its inoperative position for travel toward the inlet end of the platform.

The milk of the milk container 62 may be discharged at the rear loop 61 of the trackway 57 into an appropriate milk-receiving room or containers in such a room which may, for example, be defined by a partition 73.

It is, of course, important that the teat cups, tubes and other parts of the milking apparatus be thoroughly washed and sterilized after each use and the present apparatus contemplates the carrying out of such an operation within the view of the spectators as an additional educational adjunct of the direct milking operation per se.

Figure 10:
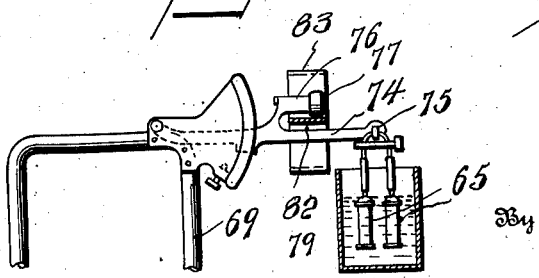
Figure 10 is a broken view in elevation, partly in section, showing the washing means for the teat cups of the milking apparatus.

To provide for this result, and as indicated more particularly in Figures 10 and 11 of the drawings, the frame 69 of the milking apparatus is provided with an arm 74 capable of being moved downwardly to a substantially horizontal position with respect to the frame and freely movable upwardly from such horizontal position, as may be necessary. The arm 74 is terminally formed at 75 with means by which the teat cups 65 of a particular milking apparatus may be supported, and the arm 74 is further provided with an overlying integral section 76 terminating in a roller 77.

It is preferred to carry out the cleansing and sterilizing operation adjacent the inlet end of the platform, that is toward the forward end of the section 59 of the trackway 57. For this purpose, there is arranged lengthwise this section of the trackway a composite tank 78 divided to present a washing and rinsing chamber 79, a sterilizing chamber 80 and a final rinsing chamber 81. Between the composite tank and the section 59 of the trackway 57 is a trackway 82, hereinafter termed the washing trackway, and positioned to receive the roller 77 during forward movement of the particular washing apparatus.

This trackway 82 is formed with an elevated portion 83 which causes the arm 74 to lift the suspended teat cups over the end wall of the composite tank and then through successive depending portions 84 and elevated portions 85, the teat cups are delivered into the respective chambers in succession to cause a thorough rinsing, sterilization and final rinsing of the teat cups. It is preferred that the trackway 82 present intermediate the length of each of the chambers of the composite tank an elevated portion 85 which will cause the teat cups to rise free of the fluid in that chamber and then descend again into the fluid during the travel. This is for the purpose of permitting the eat cups to be subjected to the action of the air during washing and sterilization.

Of course, the washing and sterilization of the teat cups require the operation of the motor to maintain the necessary suction in the parts for effective cleansing and sterilization, and to this end the service conductor 68 may be extended around the forward loop 60 of the trackway 57, as at 86, and extended lengthwise the section 59 of such trackway at least coextensive with the length of the washing trackway 82.

Of course, any means may be employed for moving the milking apparatus lengthwise the trackway 82. This may be a conventionally-coupled motor or other means, obviously unnecessary to illustrate.

As previously stated, the system is designed to readily lend itself for exhibition purposes for its educational value, and to this end the wall 2 is formed with an opening 87 coextensive or substantially coextensive with the length of the movable platform 7. The washing operation of the animals on the grating 6 is thus concealed from the spectators but the entry of the animals onto the platform and the complete milking operation are visible.

The opening in the wall 4, through which the entire operation is viewed, is, however, coextensive with the length of the trackway 57 for the milking apparatus and such trackway is of such length that the washing details are carried out beyond the inlet end of the platform 7. Therefore, the washing details are under the complete view of the spectators and positioned to avoid any interference with their view of the milking operation carried out on the movable platform 7.

A floor 88 is arranged between the walls 2 and 3 for the use of the attendants in applying, removing and providing for washing and sterilization of the milking apparatus.

What is claimed to be new is:

1. A milking apparatus including an endless moving platform for the support of the animals, and stall-defining gates automatically moved into stall-forming position above the platform.

2. A milking apparatus including an endless moving platform, a fixed supporting wall at one side thereof, a fixed frame extending longitudinally of and free of engagement with the platform, and stall-defining gates automatically moved into stall-forming relation between the supporting wall and the frame.

3. A milking apparatus including an endless moving platform, a fixed supporting wall at one side thereof, a fixed frame extending longitudinally of and free of engagement with the platform, stall-defining gates automatically moved into stall-forming relation between the supporting wall and the frame, and means for moving the gates when in stall-forming relation in synchronism with the platform.

4. A milking apparatus including an endless moving platform, a fixed supporting wall at one side thereof, a fixed frame extending longitudinally of and free of engagement with the platform, stall-defining gates automatically moved into stall-forming relation between the supporting wall and the frame, means for moving the gates when in stall-forming relation in synchronism with the platform, and automatic milking mechanism movable with and by a stall-forming gate.

5. A milking apparatus including an endless moving platform, means for operating the platform, a supporting wall at one side of the platform, a frame supported above and extending longitudinally of and free of contact with the platform, endless chains operative above the platform, stall-forming gates connected to said chains, and means for moving the gates in succession into rigid position between the supporting wall and frame to form stalls.

6. A milking apparatus including an endless moving platform, means for operating the platform, a supporting wall at one side of the platform, a frame supported above and extending longitudinally of and free of contact with the platform, endless chains operative above the platform, stall-forming gates connected to said chains, and means for moving the gates in succession into rigid position between the supporting wall and frame to form stalls, the gate carrying chains moving in synchronism with the platform.

7. A milking apparatus including an endless moving platform, means for operating the platform, a supporting wall at one side of the platform, a frame supported above and extending longitudinally of and free of contact with the platform, endless chains operative above the platform, stall-forming gates connected to said chains, means for moving the gates in succession into rigid position between the supporting wall and frame to form stalls, and means for moving the gates in succession out of stall-forming relation at the exit end of the platform.

8. A milking apparatus including an endless moving platform, and stall-forming members arranged above the platform, a portion of the members forming each stall being fixed against movement, the remaining stall-forming members moving in synchronism with the platform.

9. A milking apparatus including an endless moving platform, fixed frames defining a runway above the platform, and means automatically movable into a position between the frames to successively define a series of stalls, said means moving with the platform and defining with the frames a movable stall enclosure.

10. A milking apparatus including an endless moving platform, fixed frames in substantial line with the edges of the platform and defining a runway of which the movable platform forms the bottom, and a series of gates successively and automatically movable into positions transverse the runway to divide the runway into a series of stalls, the respective gates forming the forward and rear elements of each stall.

11. A construction as defined in claim 10, wherein the gates are supported on elements moving in synchronism with the platform.

12. A construction as defined in claim 10, wherein the gates are supported by endless chain carriers movable above the platform and in synchronism therewith.

13. A milking apparatus including an endless platform, fixed frames rising from the platform and defining therewith a runway, endless chains supported above the platform, gate-like members connected to the chains, and means arranged adjacent the ends of the chains for moving the gate-like members in succession into a position transverse the runway to define with the runway a series of stalls.

14. A construction as defined in claim 13, wherein means are provided for maintaining the gate-like members in substantially rigid position when in stall-forming relation.

HARRY C. CAIN.